United States Patent Office 3,455,982
Patented July 15, 1969

3,455,982
PHENYLALKYLMONOFLUOROACETAMIDES
Shiro Watanabe and Toshiyuki Tomoda, Osaka-shi, Japan, assignors to Daikin Kogyo Kabushiki Kaisha, Osaka-shi, Japan
No Drawing. Filed Jan. 18, 1966, Ser. No. 521,401
Claims priority, application Japan, Jan. 22, 1965, 40/3,319
Int. Cl. C07c 161/02, 121/52, 149/32
U.S. Cl. 260—454                   1 Claim

ABSTRACT OF THE DISCLOSURE

N-mono- or N,N-di-(phenylalkyl)-monofluoro-acetamides and pesticidal compositions containing such compounds.

This invention relates to monofluoroacetamide derivatives and to pesticidal compositions containing them. More particularly, the present invention relates to N-mono- or N,N-di-(phenylalkyl)-monofluoroacetamides and to pesticidal compositions containing the same.

The compounds of this invention may be expressed by the general formula:

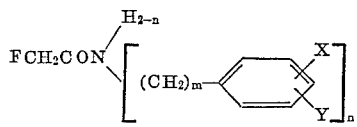

wherein X and Y are respectively —H, —F, —Cl, —Br, —I, —NO$_2$, —R, —OR, —SR, —SO$_2$R, —CN, —SCN or —NR$_2$, R being an alkyl having from 1 to 3 carbon atoms, and $m$ and $n$ are respectively an integer of from 1 to 2.

The representatives of the present compounds are exemplified in the following Table 1.

TABLE 1

| Comp. Ser. No. | Structural formula |
|---|---|
| 1 | FCH$_2$CONHCH$_2$— |
| 2 | FCH$_2$CON(CH$_2$—)$_2$ |
| 3 | FCH$_2$CONHCH$_2$—Cl |
| 4 | FCH$_2$CONHCH$_2$—Br |
| 5 | FCH$_2$CONHCH$_2$—NO$_2$ |
| 6 | FCH$_2$CON(CH$_2$—NO$_2$)$_2$ |
| 7 | FCH$_2$CONHCH$_2$—CH$_3$ |
| 8 | FCH$_2$CONHCH$_2$—OCH$_3$ |
| 9 | FCH$_2$CONHCH$_2$—SCH$_3$ |
| 10 | FCH$_2$CONHCH$_2$—SO$_2$CH$_3$ |
| 11 | FCH$_2$CONHCH$_2$—CN |
| 12 | FCH$_2$CONHCH$_2$—SCN |
| 13 | FCH$_2$CONHCH$_2$—N(CH$_3$)$_2$ |
| 14 | FCH$_2$CONHCH$_2$—Cl (with Cl) |
| 15 | FCH$_2$CONHCH$_2$—CH$_3$ (with Cl) |
| 16 | FCH$_2$CONH(CH$_2$)$_2$— |
| 17 | FCH$_2$CON((CH$_2$)$_2$—)$_2$ |
| 18 | FCH$_2$CONH(CH$_2$)$_2$—Cl |

The benzyl- or phenethyl-monofluoroacetamides of this invention are liquid or solid, white to yellow in color and almost insoluble in water, petroleum and carbon tetrachloride, but soluble in N-methyl pyrrolidone, methanol, ethanol, dioxane, acetone, methyl ethyl ketone, dimethyl formamide, etc.

The compounds of this invention may be synthesized in accordance with various methods, so that the following methods for synthesis of the compounds are illustrative only and not restrictive of the invention.

The present compounds are prepared, for example, by reacting a primary or secondary amine having the formula

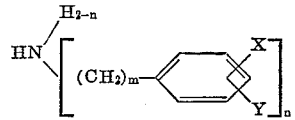

(wherein X, Y, $m$ and $n$ are as defined before) with a monofluoroacetylating agent such as monofluoroacetic acid, monofluoroacetic acid anhydride or monofluoroacetylchloride, as shown in the following Equations 1 to 3:

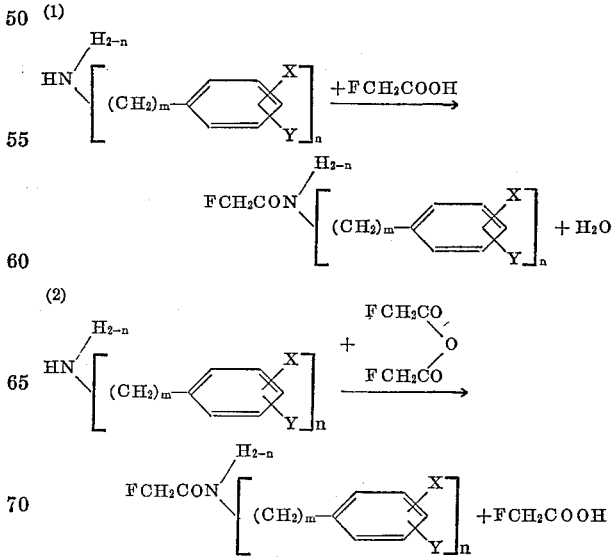

(3)

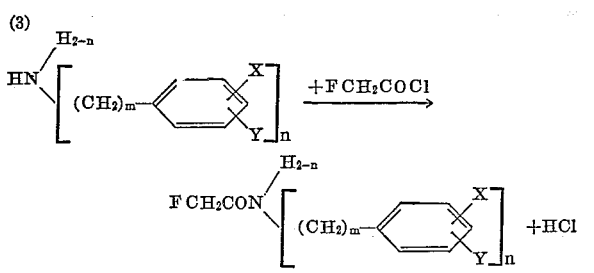

wherein X, Y, m and n are as defined before.

The reactions shown in Equations 1 to 3 above are preferably carried out in a liquid medium which is inert to the reactants and products. A suitable liquid medium should be selected in accordance with the kinds of the reactants to be employed from compounds such as chloroform, acetone, tetrahydrofuran, benzene, xylene, toluene, etc. In the reactions, it is preferred that an excess amount of monofluoroacetylating agent be employed.

The reaction shown in Equation 1 is profitably carried out by heating an organic solvent solution of the starting materials, amine and monofluoroacetic acid, at from 120° to 150° C. To accelerate the reaction a catalyst such as concentrated sulfuric acid, phosphorus pentachloride, paratoluene sulfonic acid, etc., may be added to the reaction system and water produced as a byproduct may be continuously removed from the system.

The reactions shown in Equations 2 and 3 are profitably carried out by adding dropwise under cooling (0° to 10° C.) the starting monofluoroacetylchloride or monofluoroacetic acid anhydride to an organic solvent solution of the starting amine, and heating the mixture at from 20° to 100° C., preferably from 20° C. to 50° C. To accelerate the reaction of Equation 3, a hydrogen chloride acceptor such as pyridine, sodium carbonate, etc., may be added to the reaction system.

The products of this invention can be separated from the resultant reaction mixture by conventional methods, such as filtration, recrystallization, distillation, extraction, etc.

The following six examples illustrate the production of the phenylalkylmonofluoroacetamides of this invention in more detail.

Example 1.—Preparation of N-(4-chlorobenzyl)-monofluoroacetamide

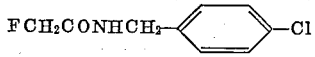

A 200-milliliter 4-necked flask equipped with a reflux condenser, agitator and two dropping funnels was charged with 100 milliliters of chloroform and 14.2 grams (0.1 mole) of 4-chlorobenzylamine

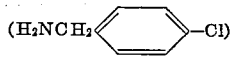

and the mixture was cooled with ice-water at 0°–5° C. 10.6 grams (0.11 mole) of monofluoroacetylchloride (FCH₂COCl) was slowly added dropwise with stirring to the mixture at such temperature, and when half the amount of monofluoroacetylchloride was added, a solution of 5.9 grams (0.055 mole) of sodium carbonate (Na₂CO₃) in 30 milliliters of water was further added dropwise through another dropping funnel so as to complete the addition of monofluoroacetylchloride and sodium carbonate aqueous solution at the same time. After completion of the addition the reaction system was allowed to warm up to room temperature and it was further stirred for one hour.

The reaction mixture was left alone to form separate layers, i.e., water layer and chloroform layer. The chloroform layer was separated from the water layer, washed with water and dried with calcium chloride. Removal of chloroform by distillation gave 15.1 grams of N-(4-chlorobenzyl)monofluoroacetamide

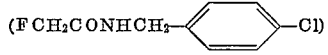

melting at 104°–106° C. Yield for the starting amine was 75.2 percent.

Example 2.—Preparation of N-(phenethyl)monofluoroacetamide

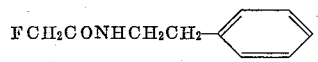

A 200-milliliter 4-necked flask with a reflux condenser was charged with 11.7 grams (0.15 mole) of monofluoroacetic acid, 12.1 grams (0.1 mole) phenethyl amine

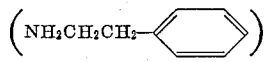

and 50 milliliters of toluene and the mixture was heated with stirring at reflux temperature for 4 hours and during the course of the reaction water was continuously removed as an azeotropic mixture of toluene and water. The resultant reaction mixture was distilled to remove the toluene contained therein and poured into ice-water to precipitate solids. The solids were washed with water and dried, whereby 17.2 grams of N-(phenethyl)monofluoroacetamide

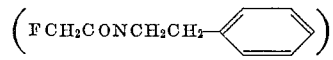

melting at 58°–60° C. was obtained. Yield for the starting amine was 95.1 percent.

Example 3.—Preparation of N,N-dibenzylmonofluoroacetamide

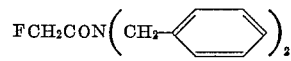

A 200-milliliter 4-necked flask equipped with a reflux condenser and dropping funnel was charged with 50 milliliters of acetone and 39.4 grams (0.20 mole) of dibenzyl amine

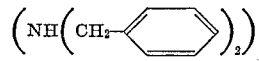

and the mixture was cooled with ice-water at 0°–10° C. 27.6 grams (0.2 mole) of monofluoroacetic acid anhydride ((FCH₂CO)₂O) was added dropwise with stirring to the mixture in about 15 minutes at such temperature. After completion of the addition the reaction system was heated with stirring at about 50° C. for one hour. The resultant reaction mixture was poured into water and the organic layer was extracted with ether. The ether extract was washed with a 5 weight percent aqueous solution of sodium carbonate (Na₂CO₃), further washed with water and then dried with calcium chloride (CaCl₂).

Ether was evaporated therefrom and the residue distilled under reduced pressure, whereby 45.1 grams of N,N-dibenzylmonofluoroacetamide boiling at 208°–210° C./10 mm. Hg was obtained. Yield for the starting amine was 87.8 percent.

Example 4.—Preparation of N,N-di(4-nitrobenzyl)-monofluoroacetamide

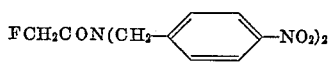

A 200-milliliter 4-necked flask equipped with a reflux condenser and dropping funnel was charged with 26.7 grams (0.1 mole) of di(4-nitrobenzyl)amine, 8.7 grams (0.11 mole) of pyridine and 50 milliliters of acetone and the mixture was cooled with ice-water to 0°–5° C. Then, 10.6 grams (0.11 mole) of monofluoroacetylchloride was slowly added dropwise with stirring to the mixture in 15 minutes at such temperature. After completion of the addition the reaction mixture was heated with stirring at 50° C. for one hour. The resultant reaction mixture was poured into ice-water to precipitate yellow solids. The solids were washed with water and dried, whereby 26.5 grams of N,N-di(4-nitrobenzyl)monofluoroacetamide

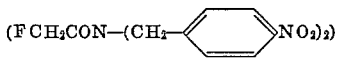

was obtained. Yield for the starting amine was 81 percent.

Example 5.—Preparation of N-(2,4-dichlorobenzyl)-monofluoroacetamide

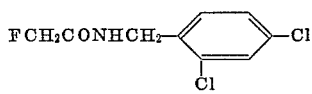

17.6 grams (0.1 mole) of 2,4-dichlorobenzyl amine

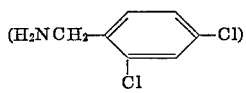

was reacted with 10.6 grams (0.11 mole) of monofluoroacetylchloride (FCH₂COCl) in the same manner as described in Example 4, whereby 21.7 grams of N-(2,4-dichlorobenzyl)monofluoroacetamide

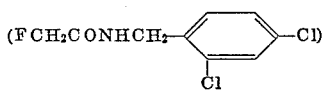

was obtained in the form of a white crystalline solid. Yield for the starting amine was 92 percent.

Example 6.—Preparation of N-(4-chlorophenethyl)-monofluoroacetamide

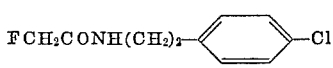

15.5 grams (0.1 mole) of 4-chlorophenethyl amine

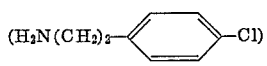

was reacted with 10.6 grams (0.11 mole) of monofluoroacetylchloride in the same manner as described in Example 4, whereby 20.5 grams of N-(4-chlorophenethyl)monofluoroacetamide

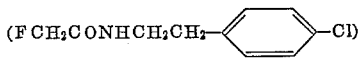

was obtained in the form of a white crystalline solid. Yield for the starting amine was 95.5 percent.

The phenylalkylmonofluoroacetamides of this invention are useful as pesticides. They exhibit a high order of pesticidal efficacy on a very broad variety of garden pests such as aphids, scales, mites, nematodes, etc. despite a low order of plant injuries and of toxicity on human and other mammalian bodies.

The phenylalkylmonofluoroacetamides of this invention further possess systemic properties, so that the compounds are particularly useful for killing sucking insects, such as aphids, scales, mites, etc. Despite such systemic properties said compounds are harmless to human and other mammalian bodies, since the compounds employed are completely expelled from the tissues of the plants within a relatively short period.

Furthermore, the phenylalkylmonofluoroacetamides of this invention have a toxic effect on any life stage of insects, that is, not only mature and immature forms but eggs as well, rendering it possible to kill even mites with only one application, since the adult insects and their eggs are usually found existing together since the life cycle of such insects is very short.

The phenylalkylmonofluoroacetamides of this invention, moreover, do not produce a noticeable tolerance in the insects even when used repeatedly, nor a cross-tolerance with conventional insecticides, such as chloric miticide, e.g.,

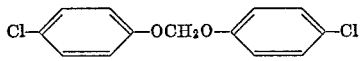

or phosphorous miticide, e.g.,

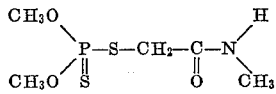

which produce a tolerance in mites, rendering it possible to kill mites having a tolerance to such conventional miticides without producing any tolerance for the compounds of this invention in mites.

Another feature of the phenylalkylmonofluoroacetamides of this invention is that the compounds are chemically stable, so that the compounds can be employed in conjunction with a wide variety of other agricultural chemicals.

In order to provide a further understanding of the specific features of the phenylalkylmonofluoroacetamides of this invention, there are shown, in Tables 2 and 3 below, experimental results relative to the pesticidal efficacy, toxicity, and plant injuring properties of the compounds of the present invention in comparison with monofluoroacetamide ($FCH_2CONH_2$), wherein the compounds of this invention are designated by the same series of numbers as were employed in Table 1 and monofluoroacetamide by A.

In each of the tests, a wettable powder of the following composition diluted with water to a specified concentration with respect to an effective ingredient was used unless otherwise specified:

| | Weight parts |
|---|---|
| Compound tested | 25 |
| Clay | 37 |
| Diatomaceous earth | 25 |
| White carbon | 6 |
| Polyvinyl alcohol | 2 |
| Sodium laurylsulfonate | 5 |

TEST 1.—Insecticidal test on bugs (*Pseudococcus comstocki*)

A pumpkin (Cucurbita) carrying adult female *Pseudococcus comstocki* was dipped in a diluted aqueous suspension of a 0.05 weight percent concentration at 25° C. for 20 seconds. The insects were then kept in a thermostatic chamber at 25° C., and mortality 72 hours after the treatment was calculated by checking the dead insects.

TEST 2.—Insecticidal test on cabbage aphids (*Brevicoryne brassicae* Linne)

Cabbage aphids carried by cabbage leaves were dipped in diluted aqueous suspensions of different concentrations at 25° C. for 10 seconds respectively. The insects were then kept in a thermostatic chamber at 25° C., and mortality 48 hours after the treatment was checked and 50% kill ($LC_{50}$) was estimated.

TEST 3.—Toxicity test on mice

Each compound for test was dispersed in a 1:1 weight ratio mixture of water and glycerine to a 1 weight percent concentration, CMC being added where necessary to increase stability of the dispersion.

The resultant solution was injected into the stomach of mice with a stomach sonde, and the $LD_{50}$ was estimated by checking mortality 48 hours after the treatment.

TEST 4.—Plant injury test

Mandarin orange plants 3 years old raised in pots were thoroughly sprayed with a diluted aqueous solution of a 0.25 weight percent concentration at 25° C. The plants were then allowed to grow under the same conditions as prior to application and plant injury 20 days after the spraying was checked. The degrees of injury are indicated in the following manner:
- —: No plant injury observed.
- ±: A slight degree of plant injury observed.

TABLE 2

| Comp. Ser. No. | Test 1 *Pseudococcus comstocki* (mortality) | Test 2 Aphids $LC_{50}$ (p.p.m.) | Test 3 Toxicity $LD_{50}$ (mg./kg.) | Test 4 Mandarin orange tree (plant injury) |
|---|---|---|---|---|
| 1 | 98 | 25 | 276 | — |
| 2 | 85 | 35 | 620 | — |
| 3 | 100 | 20 | 360 | — |
| 4 | 100 | 15 | 450 | — |
| 5 | 100 | 18 | 510 | — |
| 6 | 83 | 24 | 830 | — |
| 7 | 98 | 25 | 255 | — |
| 8 | 95 | 38 | 270 | — |
| 9 | 100 | 25 | 210 | — |
| 10 | 87 | 85 | 570 | — |
| 11 | 93 | 75 | 450 | — |
| 12 | 95 | 60 | 380 | — |
| 13 | 90 | 55 | 350 | — |
| 14 | 100 | 15 | 380 | — |
| 15 | 100 | 23 | 350 | — |
| 16 | 95 | 34 | 430 | — |
| 17 | 78 | 56 | 680 | — |
| 18 | 100 | — | 470 | — |
| A | 85 | 25 | 24 | ± |

TEST 5.—Acaricidal test

Diluted aqueous suspensions of different concentrations of the compounds (Ser. Nos. 2, 3, 4, 5 and 16) and monofluoroacetamide (A) as shown in Table 3 below were respectively sprayed over mandarin orange trees on citrus red mites (*Panonychus citri*), which were kept in a thermostatic chamber at 28° C. and mortality 48 hours after the treatment was checked, results of which are shown in Table 3.

TABLE 3

| Comp. Ser. No. | Concentration 0.1 | 0.05 | 0.005 |
|---|---|---|---|
| 2 | 100 | 85 | 7 |
| 3 | 100 | 93 | 10 |
| 4 | 100 | 83 | 11 |
| 5 | 100 | 99 | 25 |
| 16 | 100 | 87 | 8 |
| A | 82 | 53 | 10 |

It is obvious from the above results that the compounds of this invention exhibit a strong pesticidal efficacy on various harmful garden pests, while their toxicity is negligible and their propensity to injure plants is almost nil, so that the present compounds can be employed as pesticides with utmost safety.

Their pesticidal efficacy is particularly prominent on harmful sucking insects, and thus are suitable for killing aphids, scales, mites, etc.

The phenylalkylmonofluoroacetamides of this invention can be prepared by conventional methods in any desired form, such as a dust, pellets, wettable powder or an emulsifiable solution. Solid or liquid carriers are employed in accordance with the desired form of preparation, and the resultant preparations are employed by diluting to the desired concentration, where necessary.

To prepare a dust, for instance, any of the phenylalkylmonofluoroacetamides of this invention may be homogeneously pulverized with an inert carrier, such as talc, clay, bentonite or diatomaceous earth. A preferred concentration of the effective ingredients is 0.5 to 5 weight percent. There may be added a coloring or adhesive agent, where desirable. The resultant dust is applied to plants in the range of from 2 to 5 kg. per 10 ares.

To prepare a wettable powder, any of the phenylalkylmonofluoroacetamides of this invention is homogeneously pulverized with any of the aforespecified carriers and an ionic or nonionic surfactant, such as an organic sodium sulfonate, a condensation product of ethylene oxide or propylene oxide and an organic acid or phenol, or sugar esters. A 5 to 70 weight percent concentration is preferred.

There may be added a coloring or adhesive agent, where desirable, such as polyvinyl alcohol or ligninsulfonate. The resultant powder is homogeneously diluted with water to the range of from 1,000 to 5,000 times the original weight of the phenylalkylmonofluoroacetamide employed as a main effective ingredient and applied to the plants in the range of from 50 to 800 liters per 10 ares.

To prepare pellets, any of the phenylalkylmonofluoroacetamides of this invention is first prepared in the form of a dust or a wettable powder of a suitable concentration, e.g., 0.5 to 20 weight percent, in accordance with the aforesaid procedures, kneaded homogeneously with water, pelletized to a size of from 0.3 to 10 mm. in diameter, and then dried. Pellets thus prepared are applied to the plants in the range of from 2 to 5 kg. per 10 ares.

To prepare an emulsifiable solution, any of the phenylalkylmonofluoroacetamide of this invention is homogeneously mixed in a suitable concentration, e.g., 10 to 60 weight percent, with a surfactant as specified before. There may be employed an organic solvent, where desirable, such as xylene, benzene, methanol, ethanol, isopropanol, methyl naphthalene, solvent naphtha, acetone or methyl ethyl ketone. The resultant solution is preferably diluted with water to the range of from 1,000 to 5,000 times the original weight of the phenylalkylmonofluoroacetamide employed as a main effective ingredient and applied to the plants in the range of from 50 to 800 liters per 10 ares.

The above methods of preparation and the order of concentration, however, are illustrative only and do not limit in any way the scope and extent of this invention.

Furthermore, since the phenylalkylmonofluoroacetamides of this invention are chemically stable, other insecticidal and germicidal compositions, fertilizing chemicals, plant growth controllers, and similar substances may be employed in admixture with any of the compositions of this invention during the course of preparation or application.

For a fuller understanding of the invention, in the following description there are illustrated examples of the preparation of a dust, a wettable powder and an emulsifiable solution and the results of field tests therewith.

(1) Dust: Weight parts
N,N-di(4-nitrophenethyl)-fluoroacetamide _____ 1
Clay _____ 99

The above components were mixed and pulverized homogeneously into a dust. The dust thus obtained was evenly dusted at the rate of 3.5 kg. per 10 ares over an orchard of mandarin orange trees 5 years old on citrus red mites (*Panonychus citri*), citrus aphids (*Aphis atricidus*), green broad-winged plant hoppers (*Glisha distinctissima* Walker) and scales (*Unaspis yanonensis*). 15 days after application said insects were almost completely destroyed, and 50 days after application no compound of the invention was detected by analysis from the leaves, fruits and sap of the trees.

(2) Wettable powder: Weight parts
N-(4-chlorobenzyl)-fluoroacetamide _____ 10
Diatomaceous earth _____ 30
Clay _____ 45
Sodium lauryl sulfonate _____ 5
Polyvinyl alcohol _____ 10

The above components were mixed and homogeneously pulverized into a wettable powder. 1,600 grams of said wettable powder were dispersed in 300 liters of water and the aqueous emulsion was evenly sprayed over 10 ares of an orchard of mandarin orange trees 3 years old carrying citrus red mites (*Panonychus citri*) and citrus aphids (*Aphis atricidus*). Observations made 15 days and 50 days after application, indicated that the same results were obtained as in the test of the dust (1) above.

(3) Emulsifiable solution:

| | Weight parts |
|---|---|
| N-benzylfluoroacetamide | 10 |
| N-methylpyrrolidone | 10 |
| Denatured alcohol | 70 |
| Sodium dodecylbenzenesulfonate | 3 |
| 1:10 molar condensate of nonylphenol and ethylene oxide | 7 |

The above components were thoroughly mixed to form an emulsifiable solution. 2,000 grams of said solution was dispersed in 300 liters of water and applied in the same manner as that employed with the wettable powder described above. Observations made 15 days and 50 days after application indicated that the same results were obtained as in the test of the wettable powder.

What is claimed is:
1. A phenylalkylmonofluoroacetamide compound having the structure

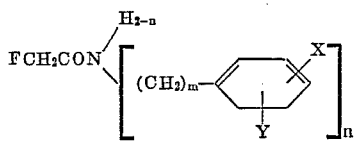

wherein X and Y are, respectively, one member of the group consisting of H, F, Cl, Br, I, $NO_2$, R, OR, SR, $SO_2R$, CN, SCN and $NR_2$,
R is an alkyl radical having 1 to 3 carbons atoms, and
$m$ and $n$ are, respectively, an integer of 1 or 2.

References Cited

UNITED STATES PATENTS 2,863,752 12/1958 Hamm et al. _____ 260—562
2,409,315 10/1946 Rigby et al. _____ 260—562

OTHER REFERENCES

Speziale et al., J. Am. Chem. Soc., vol. 78, pp. 2556–57 (1956).

HENRY R. JILES, Primary Examiner

H. I. MOATZ, Assistant Examiner

U.S. Cl. X.R.

260—562, 465, 570.8, 570.9; 424—324